United States Patent
Engel et al.

(10) Patent No.: US 10,296,469 B1
(45) Date of Patent: *May 21, 2019

(54) ACCESS CONTROL IN A FLASH STORAGE SYSTEM

(71) Applicant: PURE Storage, Inc., Mountain View, CA (US)

(72) Inventors: Joern Engel, Mountain View, CA (US); Alan Driscoll, Fremont, CA (US); Neil Vachharajani, San Francisco, CA (US); Ronald S. Karr, Palo Alto, CA (US)

(73) Assignee: Pure Storage, Inc., Mountain View, CA (US)

( * ) Notice: Subject to any disclaimer, the term of this patent is extended or adjusted under 35 U.S.C. 154(b) by 69 days.

This patent is subject to a terminal disclaimer.

(21) Appl. No.: 14/340,169

(22) Filed: Jul. 24, 2014

(51) Int. Cl.
G06F 12/14 (2006.01)

(52) U.S. Cl.
CPC .................. G06F 12/145 (2013.01)

(58) Field of Classification Search
None
See application file for complete search history.

(56) References Cited

U.S. PATENT DOCUMENTS

| | | |
|---|---|---|
| 5,208,813 A | 5/1993 | Stallmo |
| 5,403,639 A | 4/1995 | Belsan |
| 5,463,741 A * | 10/1995 | Levenstein ............... G06F 9/52 709/225 |
| 5,850,521 A * | 12/1998 | Morganti ............... G06F 15/17 709/208 |
| 5,872,941 A * | 2/1999 | Goodrum ............ G06F 13/4054 370/401 |
| 5,933,824 A * | 8/1999 | Dekoning ................ G06F 9/52 |
| 5,940,838 A | 8/1999 | Schmuck et al. |

(Continued)

FOREIGN PATENT DOCUMENTS

| | | |
|---|---|---|
| CN | 103370685 A | 10/2013 |
| CN | 103370686 A | 10/2013 |

(Continued)

OTHER PUBLICATIONS

Microsoft Corporation, "GCSettings.IsServerGC Property", Retrieved Oct. 27, 2013 via the WayBack Machine, 3 pages.

(Continued)

*Primary Examiner* — Prasith Thammavong
*Assistant Examiner* — Alex G Olson

(57) ABSTRACT

Systems, apparatuses, methods, and computer-readable storage mediums for performing lease-based fencing using a time-limited lease window. During the time-limited lease window, writes to a shared storage medium are permitted, while writes are denied for expired leases. When a successful heartbeat is generated for a primary storage controller, the lease window is extended for the primary storage controller from the time of a previous heartbeat. Accordingly, a prolonged stall between successive heartbeats by the primary storage controller will result in the newly extended lease being expired at the time it is granted. This scheme prevents a split brain scenario from occurring when a secondary storage controller takes over as the new primary storage controller in response to detecting the stall.

20 Claims, 8 Drawing Sheets

(56) References Cited

U.S. PATENT DOCUMENTS

| | | | | |
|---|---|---|---|---|
| 6,032,216 A * | 2/2000 | Schmuck | G06F 9/52 | 707/999.01 |
| 6,055,590 A * | 4/2000 | Pettey | G06F 13/4045 | 370/402 |
| 6,076,126 A * | 6/2000 | Shagam | G06F 9/52 | 709/210 |
| 6,151,659 A * | 11/2000 | Solomon | G06F 3/0622 | 710/200 |
| 6,263,350 B1 | 7/2001 | Wollrath et al. | | |
| 6,412,045 B1 | 6/2002 | DeKoning et al. | | |
| 6,449,648 B1 * | 9/2002 | Waldo | G06F 9/4411 | 707/999.01 |
| 6,526,418 B1 * | 2/2003 | Midgley | G06F 11/1451 | 707/640 |
| 6,622,163 B1 * | 9/2003 | Tawill | G06F 3/0614 | 709/200 |
| 6,687,702 B2 * | 2/2004 | Vaitheeswaran | G06F 9/544 | |
| 6,718,448 B1 | 4/2004 | Ofer | | |
| 6,757,769 B1 | 6/2004 | Ofer | | |
| 6,775,703 B1 * | 8/2004 | Burns | G06F 12/0866 | 709/223 |
| 6,799,283 B1 | 9/2004 | Masaaki et al. | | |
| 6,834,298 B1 | 12/2004 | Singer et al. | | |
| 6,850,938 B1 | 2/2005 | Sadjadi | | |
| 6,915,434 B1 | 7/2005 | Kuroda | | |
| 6,934,749 B1 * | 8/2005 | Black | G06F 1/14 | 709/217 |
| 6,965,923 B2 * | 11/2005 | Norman | G06F 13/1694 | 709/213 |
| 6,973,521 B1 * | 12/2005 | Indiresan | G06F 9/526 | 710/200 |
| 6,973,549 B1 | 12/2005 | Testardi | | |
| 7,028,216 B2 | 4/2006 | Aizawa et al. | | |
| 7,028,218 B2 | 4/2006 | Schwarm et al. | | |
| 7,039,827 B2 * | 5/2006 | Meyer | G06F 3/0605 | 714/4.11 |
| 7,065,618 B1 * | 6/2006 | Ghemawat | G06F 17/30215 | 707/999.201 |
| 7,173,929 B1 * | 2/2007 | Testardi | G06F 3/0611 | 370/353 |
| 7,216,164 B1 | 5/2007 | Whitmore et al. | | |
| 7,457,880 B1 * | 11/2008 | Kim | G06F 17/30171 | 709/216 |
| 7,783,682 B1 | 8/2010 | Patterson | | |
| 7,873,619 B1 | 1/2011 | Faibish et al. | | |
| 7,913,300 B1 | 3/2011 | Flank et al. | | |
| 7,933,936 B2 | 4/2011 | Aggarwal et al. | | |
| 7,979,613 B2 | 7/2011 | Zohar et al. | | |
| 8,086,652 B1 | 12/2011 | Bisson et al. | | |
| 8,117,464 B1 | 2/2012 | Kogelnik | | |
| 8,205,065 B2 | 6/2012 | Matze | | |
| 8,219,762 B1 * | 7/2012 | Shavit | G06F 12/0815 | 711/100 |
| 8,341,458 B2 * | 12/2012 | Butterworth | G06F 11/2064 | 707/622 |
| 8,352,540 B2 | 1/2013 | Anglin et al. | | |
| 8,489,636 B2 * | 7/2013 | Scales | G06F 17/30067 | 707/781 |
| 8,527,544 B1 | 9/2013 | Colgrove et al. | | |
| 8,549,364 B2 * | 10/2013 | Ziskind | G06F 11/0709 | 709/203 |
| 8,560,747 B1 * | 10/2013 | Tan | G06F 9/526 | 710/200 |
| 8,621,241 B1 | 12/2013 | Stephenson | | |
| 8,700,875 B1 | 4/2014 | Barron et al. | | |
| 8,719,225 B1 * | 5/2014 | Rath | G06F 17/30575 | 707/634 |
| 8,751,463 B1 | 6/2014 | Chamness | | |
| 8,806,160 B2 | 8/2014 | Colgrove et al. | | |
| 8,874,850 B1 | 10/2014 | Goodson et al. | | |
| 8,949,430 B2 * | 2/2015 | Mueller | G06F 9/5061 | 709/212 |
| 8,959,305 B1 | 2/2015 | Lecrone et al. | | |
| 8,990,954 B2 * | 3/2015 | Cook | G06F 17/30171 | 713/164 |
| 9,423,967 B2 | 8/2016 | Colgrove et al. | | |
| 9,436,396 B2 | 9/2016 | Colgrove et al. | | |
| 9,436,720 B2 | 9/2016 | Colgrove et al. | | |
| 9,454,476 B2 | 9/2016 | Colgrove et al. | | |
| 9,454,477 B2 | 9/2016 | Colgrove et al. | | |
| 9,513,820 B1 | 12/2016 | Shalev | | |
| 9,516,016 B2 | 12/2016 | Colgrove et al. | | |
| 9,542,237 B2 * | 1/2017 | Baron | G06F 9/526 | |
| 9,552,248 B2 | 1/2017 | Miller et al. | | |
| 2002/0038436 A1 | 3/2002 | Suzuki | | |
| 2002/0049890 A1 * | 4/2002 | Bosisio | G06F 12/0813 | 711/146 |
| 2002/0087544 A1 | 7/2002 | Selkirk et al. | | |
| 2002/0178335 A1 | 11/2002 | Selkirk et al. | | |
| 2003/0140209 A1 | 7/2003 | Testardi | | |
| 2004/0049572 A1 | 3/2004 | Yamamoto et al. | | |
| 2004/0088396 A1 * | 5/2004 | Hammons | H04L 67/1097 | 709/223 |
| 2004/0117563 A1 * | 6/2004 | Wu | G06F 9/52 | 711/150 |
| 2004/0123053 A1 * | 6/2004 | Karr | G06F 11/0727 | 711/152 |
| 2005/0066095 A1 | 3/2005 | Mullick et al. | | |
| 2005/0216535 A1 | 9/2005 | Saika et al. | | |
| 2005/0223154 A1 | 10/2005 | Uemura | | |
| 2005/0262143 A1 * | 11/2005 | Rao | G06F 9/5061 | 709/204 |
| 2006/0074940 A1 * | 4/2006 | Craft | G06F 17/30194 | |
| 2006/0075061 A1 * | 4/2006 | Garcia | G06F 9/526 | 709/213 |
| 2006/0136365 A1 | 6/2006 | Kedem et al. | | |
| 2006/0155946 A1 | 7/2006 | Ji | | |
| 2007/0067585 A1 | 3/2007 | Ueda et al. | | |
| 2007/0162954 A1 | 7/2007 | Pela | | |
| 2007/0171562 A1 | 7/2007 | Maejima et al. | | |
| 2007/0174673 A1 | 7/2007 | Kawaguchi et al. | | |
| 2007/0220313 A1 | 9/2007 | Katsuragi et al. | | |
| 2007/0245090 A1 | 10/2007 | King et al. | | |
| 2007/0266179 A1 | 11/2007 | Chavan et al. | | |
| 2008/0059699 A1 | 3/2008 | Kubo et al. | | |
| 2008/0065852 A1 | 3/2008 | Moore et al. | | |
| 2008/0120474 A1 * | 5/2008 | Hastings | G06F 12/109 | 711/147 |
| 2008/0134174 A1 | 6/2008 | Sheu et al. | | |
| 2008/0155191 A1 | 6/2008 | Anderson et al. | | |
| 2008/0168300 A1 * | 7/2008 | Brooks | G06F 11/0709 | 714/2 |
| 2008/0178040 A1 | 7/2008 | Kobayashi | | |
| 2008/0209096 A1 | 8/2008 | Lin et al. | | |
| 2008/0243847 A1 * | 10/2008 | Rasmussen | G06F 17/30171 | |
| 2008/0244205 A1 | 10/2008 | Amano et al. | | |
| 2008/0275928 A1 | 11/2008 | Shuster | | |
| 2008/0285083 A1 | 11/2008 | Aonuma | | |
| 2008/0307270 A1 | 12/2008 | Li | | |
| 2009/0006587 A1 | 1/2009 | Richter | | |
| 2009/0037662 A1 | 2/2009 | La Frese et al. | | |
| 2009/0150459 A1 * | 6/2009 | Blea | G06F 17/30575 | |
| 2009/0204858 A1 | 8/2009 | Kawaba | | |
| 2009/0228648 A1 | 9/2009 | Wack | | |
| 2009/0300084 A1 | 12/2009 | Whitehouse | | |
| 2010/0017409 A1 * | 1/2010 | Rawat | H04L 41/00 | 707/E17.007 |
| 2010/0057673 A1 | 3/2010 | Savov | | |
| 2010/0058026 A1 | 3/2010 | Heil et al. | | |
| 2010/0067706 A1 | 3/2010 | Anan et al. | | |
| 2010/0077205 A1 | 3/2010 | Ekstrom et al. | | |
| 2010/0082879 A1 | 4/2010 | McKean et al. | | |
| 2010/0106905 A1 | 4/2010 | Kurashige et al. | | |
| 2010/0153620 A1 | 6/2010 | McKean et al. | | |
| 2010/0153641 A1 | 6/2010 | Jagadish et al. | | |
| 2010/0191897 A1 | 7/2010 | Zhang et al. | | |
| 2010/0250802 A1 | 9/2010 | Waugh et al. | | |
| 2010/0250806 A1 * | 9/2010 | Devilla | G06F 13/1605 | 710/110 |
| 2010/0250882 A1 | 9/2010 | Hutchison et al. | | |
| 2010/0281225 A1 | 11/2010 | Chen et al. | | |

(56) References Cited

U.S. PATENT DOCUMENTS

| | | | |
|---|---|---|---|
| 2010/0287327 A1 | 11/2010 | Li et al. | |
| 2011/0029810 A1* | 2/2011 | Jaisinghani | H04L 41/12 714/4.1 |
| 2011/0072300 A1 | 3/2011 | Rousseau | |
| 2011/0137879 A1* | 6/2011 | Dubey | G06F 17/30171 707/704 |
| 2011/0145598 A1 | 6/2011 | Smith et al. | |
| 2011/0161559 A1 | 6/2011 | Yurzola et al. | |
| 2011/0167221 A1 | 7/2011 | Pangal et al. | |
| 2011/0185160 A1* | 7/2011 | Gaskins | G06F 11/364 712/216 |
| 2011/0191465 A1* | 8/2011 | Hofstaedter | G06F 15/173 709/224 |
| 2011/0238634 A1 | 9/2011 | Kobara | |
| 2012/0023375 A1 | 1/2012 | Dutta et al. | |
| 2012/0036309 A1 | 2/2012 | Dillow et al. | |
| 2012/0079102 A1* | 3/2012 | Damodaran | H03K 19/0016 709/224 |
| 2012/0117029 A1 | 5/2012 | Gold | |
| 2012/0179798 A1* | 7/2012 | Pafumi | G06F 9/5072 709/223 |
| 2012/0198175 A1 | 8/2012 | Atkisson | |
| 2012/0239899 A1* | 9/2012 | Adderly | G06F 9/5016 711/170 |
| 2012/0330954 A1 | 12/2012 | Sivasubramanian et al. | |
| 2013/0042052 A1 | 2/2013 | Colgrove et al. | |
| 2013/0046995 A1 | 2/2013 | Movshovitz | |
| 2013/0047029 A1 | 2/2013 | Ikeuchi et al. | |
| 2013/0091102 A1 | 4/2013 | Nayak | |
| 2013/0205110 A1 | 8/2013 | Kettner | |
| 2013/0227236 A1 | 8/2013 | Flynn et al. | |
| 2013/0232261 A1* | 9/2013 | Wright | H04L 41/50 709/224 |
| 2013/0275391 A1 | 10/2013 | Batwara et al. | |
| 2013/0275656 A1 | 10/2013 | Talagala et al. | |
| 2013/0283058 A1 | 10/2013 | Fiske et al. | |
| 2013/0290648 A1 | 10/2013 | Shao et al. | |
| 2013/0290967 A1* | 10/2013 | Calciu | G06F 9/526 718/102 |
| 2013/0318314 A1 | 11/2013 | Markus et al. | |
| 2013/0339303 A1 | 12/2013 | Potter et al. | |
| 2014/0006465 A1* | 1/2014 | Davis | G06F 17/30194 707/827 |
| 2014/0025820 A1* | 1/2014 | Rawat | H04L 41/00 709/225 |
| 2014/0052946 A1 | 2/2014 | Kimmel | |
| 2014/0068791 A1 | 3/2014 | Resch | |
| 2014/0089730 A1 | 3/2014 | Watanabe et al. | |
| 2014/0101361 A1 | 4/2014 | Gschwind | |
| 2014/0143517 A1 | 5/2014 | Jin et al. | |
| 2014/0172929 A1 | 6/2014 | Sedayao et al. | |
| 2014/0181421 A1* | 6/2014 | O'Connor | G06F 9/50 711/148 |
| 2014/0201150 A1 | 7/2014 | Kumarasamy et al. | |
| 2014/0215129 A1 | 7/2014 | Kuzmin et al. | |
| 2014/0229131 A1 | 8/2014 | Cohen et al. | |
| 2014/0229452 A1 | 8/2014 | Serita et al. | |
| 2014/0281308 A1 | 9/2014 | Lango et al. | |
| 2014/0325115 A1 | 10/2014 | Ramsundar et al. | |
| 2014/0359225 A1* | 12/2014 | Lee | G06F 12/084 711/130 |
| 2014/0380425 A1* | 12/2014 | Lockett | H04L 63/20 726/4 |
| 2015/0234709 A1 | 8/2015 | Koarashi | |
| 2015/0244775 A1 | 8/2015 | Vibhor et al. | |
| 2015/0278534 A1 | 10/2015 | Thiyagarajan et al. | |
| 2015/0378895 A1* | 12/2015 | Gschwind | G06F 12/084 711/130 |
| 2016/0019114 A1 | 1/2016 | Han et al. | |
| 2016/0098191 A1 | 4/2016 | Golden et al. | |
| 2016/0098199 A1 | 4/2016 | Golden et al. | |

FOREIGN PATENT DOCUMENTS

| | | |
|---|---|---|
| CN | 104025010 B | 11/2016 |
| EP | 3066610 A1 | 9/2016 |
| EP | 3082047 A1 | 10/2016 |
| EP | 3120235 A | 1/2017 |
| JP | 2007-087036 A | 4/2007 |
| JP | 2007-094472 A | 4/2007 |
| JP | 2008-250667 A | 10/2008 |
| JP | 2010-211681 A | 9/2010 |
| WO | WO-1995/002349 A1 | 1/1995 |
| WO | WO-1999/013403 A1 | 3/1999 |
| WO | WO-2008/102347 A1 | 8/2008 |
| WO | WO-2008/102347 A1 | 8/2008 |
| WO | WO-2010/071655 A1 | 6/2010 |

OTHER PUBLICATIONS

Microsoft Corporation, "Fundamentals of Garbage Collection", Retrieved Aug. 30, 2013 via the WayBack Machine, 11 pages.

* cited by examiner

Table 400

| Entry Number | Time of Successful Heartbeat | Time of Previous Heartbeat | Lease Window | Time When New Lease Window Expires |
|---|---|---|---|---|
| 405A | .1 seconds | 0 seconds | .5 seconds | .5 seconds |
| 405B | .2 seconds | .1 seconds | .5 seconds | .6 seconds |
| 405C | .3 seconds | .2 seconds | .5 seconds | .7 seconds |
| 405D | .4 seconds | .3 seconds | .5 seconds | .8 seconds |
| 405E | .5 seconds | .4 seconds | .5 seconds | .9 seconds |
| ⋮ | ⋮ | ⋮ | ⋮ | ⋮ |

FIG. 4

Table 600

| Entry Number | Time of Successful Heartbeat | Time of Previous Heartbeat | Lease Window | Time When New Lease Window Expires |
|---|---|---|---|---|
| 605A | 0 seconds | -.1 seconds | .5 seconds | .4 seconds |
| 605B | 1.1 seconds | 0 seconds | .5 seconds | .5 seconds |

Table 610

| Entry Number | Time of Successful Heartbeat | Time of Previous Heartbeat | Lease Window | Time When New Lease Window Expires |
|---|---|---|---|---|
| 615A | 1 second | - | - | - |
| 615B | 1.1 seconds | 1 second | .5 seconds | 1.5 seconds |
| 615C | 1.2 seconds | 1.1 seconds | .5 seconds | 1.6 seconds |
| 615D | 1.3 seconds | 1.2 seconds | .5 seconds | 1.7 seconds |
| ⋮ | ⋮ | ⋮ | ⋮ | ⋮ |

FIG. 6

ACCESS CONTROL IN A FLASH STORAGE SYSTEM

BACKGROUND

Technical Field

Embodiments described herein relate to fencing and, more particularly, to techniques for implementing reliable lease-based fencing mechanisms for shared storage devices.

Description of the Related Art

Persistent reservations provide a mechanism for both heartbeating between several cluster members and performing access control to shared storage medium(s). However, existing approaches to fencing are unreliable due to shortcomings in common implementations. For example, a storage system may include a primary storage controller and a secondary storage controller coupled to a plurality of storage devices. When the primary storage controller experiences a delay or stall, the secondary storage controller may take over as the new primary storage controller. However, the old primary storage controller may return from the stall and attempt to perform an unauthorized access to the shared storage medium(s), potentially causing data corruption or other unintended behavior. To prevent this scenario and other similar scenarios, more reliable fencing mechanisms are needed.

SUMMARY OF EMBODIMENTS

Various embodiments of systems, apparatuses, methods, and computer readable storage mediums for implementing lease-based fencing are contemplated.

In one embodiment, multiple storage controllers may be coupled to one or more shared storage mediums for shared access and lease-based fencing may be utilized to control access to the shared stored mediums. Lease-based fencing may allow a primary storage controller to utilize a time-limited lease window during which accesses to the shared storage mediums are permitted, while accesses may be prohibited for expired leases. In one embodiment, write operations may be allowed for the primary controller with a current lease window and write operations may be prevented for one or more secondary controllers. In this embodiment, read operations may be allowed for all controllers.

In one embodiment, the primary storage controller may be configured to generate heartbeats at regularly spaced intervals (or heartbeat intervals). When the primary storage controller generates a successful heartbeat, the lease window may be extended, with the extension being calculated from a prior heartbeat. In one embodiment, the lease extension may be calculated from the previous (or most recent) heartbeat before the current heartbeat. In another embodiment, the lease extension may be calculated from a prior heartbeat performed two or more heartbeats before the current heartbeat. In a further embodiment, the lease extension may be calculated from a previous point in time when a prior lease extension was granted. In other embodiments, the lease extension may be calculated from a different point in time prior to the current heartbeat.

In one embodiment, if the secondary storage controller does not detect a heartbeat from the primary storage controller for a certain period of time (or takeover window), the secondary storage controller may take over as the new primary storage controller. If the old primary storage controller comes back up and generates a new heartbeat, it may be granted a lease extension which is calculated from a prior heartbeat. Accordingly, the lease extension will already be expired by the time it is granted if the takeover window is larger than the lease window. Therefore, the old primary storage controller will not be able to perform an unauthorized access to the shared storage medium(s) after the secondary storage controller has taken over as the new primary storage controller.

These and other embodiments will become apparent upon consideration of the following description and accompanying drawings.

BRIEF DESCRIPTION OF THE DRAWINGS

FIG. 4 illustrates one embodiment of a table storing entries corresponding to successful heartbeats.

FIG. 6 illustrates one embodiment of two tables storing entries corresponding to successful heartbeats.

Figure 1:
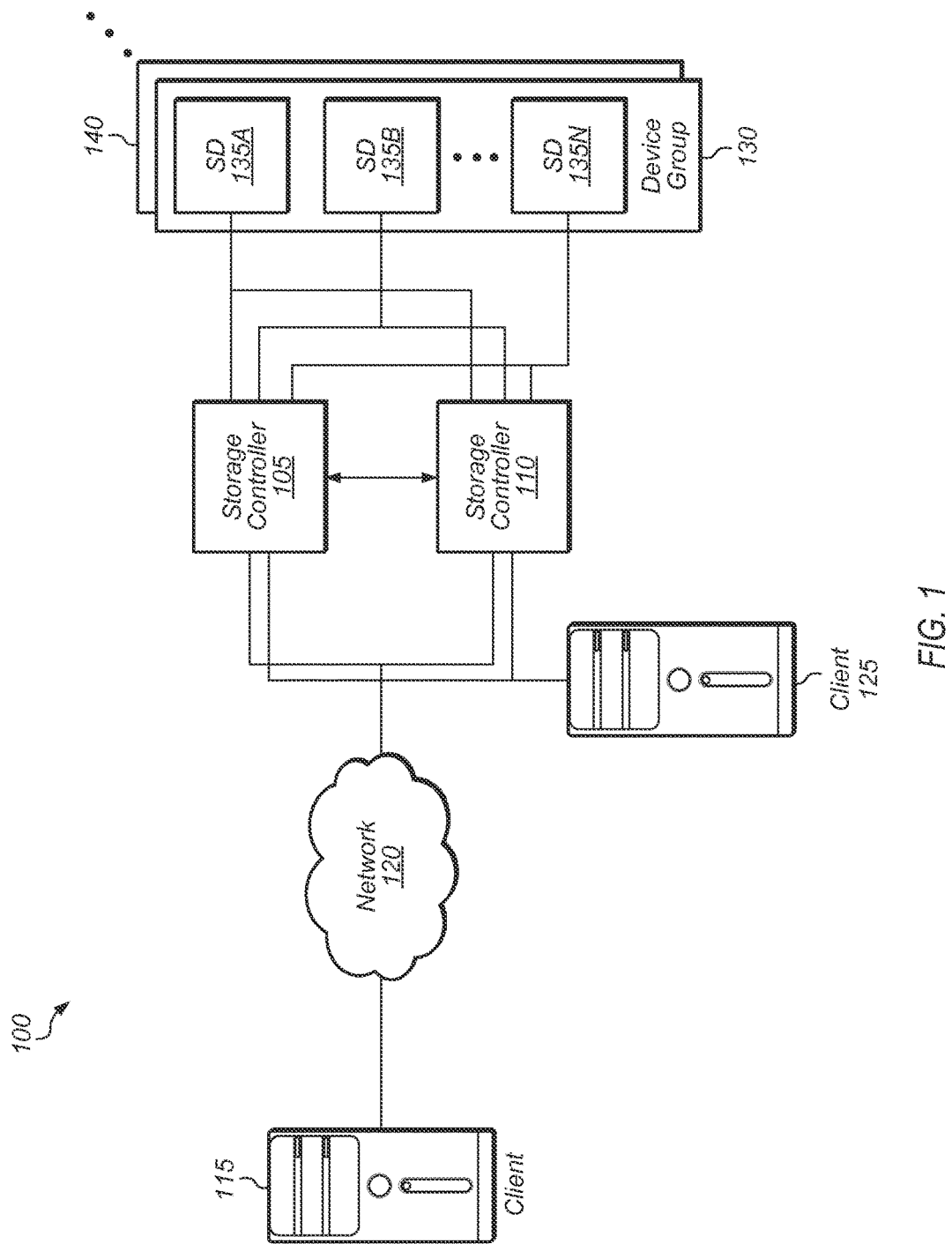
FIG. 1 is a generalized block diagram illustrating one embodiment of a storage system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, signals, computer program instruction, and techniques have not been shown in detail to avoid obscuring the present invention. It will be appreciated that for simplicity and clarity of illustration, elements shown in the figures have not necessarily been drawn to scale. For example, the dimensions of some of the elements may be exaggerated relative to other elements.

This specification includes references to "one embodiment". The appearance of the phrase "in one embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A system comprising a storage device . . . ." Such a claim does not foreclose the system from including additional components (e.g., a network interface, one or more processors, a storage controller).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, paragraph (f), for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Referring now to FIG. 1, a generalized block diagram of one embodiment of a storage system 100 is shown. Storage system 100 may include storage controllers 105 and 110 and storage device groups 130 and 140. In other embodiments, storage system 100 may include other numbers of storage controllers. Storage device groups 130 and 140 are representative of any number of storage device groups (or data storage arrays) which may be included in storage system 100. As shown, storage device group 130 includes storage devices 135A-N, which are representative of any number and type of storage devices (e.g., solid-state drives (SSDs)). For example, in various embodiments, storage devices 135A-N may utilize a solid-state storage medium such as flash memory, static random access memory (SRAM), dynamic RAM (DRAM), etc. In other embodiments, storage devices 135A-N may be hard disk drives. In further embodiments, storage devices 135A-N may utilize both solid-state storage and hard disk drive storage. Storage device group 140 may also include a plurality of storage devices which are not shown to avoid obscuring the figure.

Each of storage controllers 105 and 110 may include software and/or hardware configured to provide access to storage devices 135A-N. Storage controllers 105 and 110 may be coupled directly to client computer system 125, and storage controllers 105 and 110 may be coupled remotely over network 120 to client computer system 115. Clients 115 and 125 are representative of any number of clients which may utilize storage controllers 105 and 110 for storing and accessing data in system 100. It is noted that some systems may include only a single client, connected directly or remotely to storage controllers 105 and 110. Although storage controllers 105 and 110 are shown as being separate from storage device groups 130 and 140, in some embodiments, portions or the entirety of storage controllers 105 and 110 may be located within one or each of storage device groups 130 and 140.

Storage controllers 105 and 110 may be connected to each other and to clients 115 and 125 using any suitable connection (e.g., local area network (LAN), storage area network (SAN)). In one embodiment, the connection between storage controllers 105 and 110 may be used for the delivery of heartbeat signals. Storage controllers 105 and 110 may also be connected to storage device groups 130 and 140 using any of a variety of connections. In one embodiment, the interfaces between controllers 105 and 110 and storage devices of storage device groups 130 and 140 may be custom designed interfaces. Alternatively, in other embodiments, these interfaces may utilize a standard communication protocol. For example, the interfaces between controllers 105 and 110 and storage devices of storage device groups 130 and 140 may utilize a Serial Advanced Technology Attachment ("SATA") bus protocol, a Small Computer System Interface ("SCSI") bus protocol, a Serial Attached SCSI ("SAS") bus protocol, a Peripheral Component Interconnect Express (PCIe) bus protocol, and/or any of various other communication protocols.

In a typical configuration, one of storage controllers 105 and 110 may be the primary storage controller and the other of storage controllers 105 and 110 may be the secondary storage controller. In systems with three or more controllers, one controller may be the primary controller and the other controllers may be secondary controllers. The various connections to and from storage controllers 105 and 110 may be configured to allow a high availability configuration and to allow either of storage controllers 105 and 110 to serve as the primary storage controller. In this configuration, the primary storage controller may have read and write access to storage device groups 130 and 140 while the secondary storage controller may have only read access to storage device groups 130 and 140. In other embodiments, other configurations may be utilized. For example, one storage controller may have access to a first portion of storage device groups 130 and 140 and the other storage controller may have access to a second portion of storage device groups 130 and 140, and access may be shared to a third portion of storage device groups 130 and 140. Additional configurations are possible and are contemplated.

Storage controllers 105 and 110 may include or be coupled to a base operating system (OS), a volume manager, and additional control logic for implementing the various techniques disclosed herein. Storage controllers 105 and 110 may also include and/or execute on any number of processors and may include and/or execute on a single computing device or be spread across multiple computing devices, depending on the embodiment. The computing device(s) may be servers, workstations, or other types of computing devices. In some embodiments, storage controllers 105 and 110 may include or execute on one or more file servers and/or block servers. Storage controllers 105 and 110 may use any of various techniques for replicating data across devices 135A-N to prevent loss of data due to the failure of a device or the failure of storage locations within a device.

Storage controllers 105 and 110 may include software and/or control logic for implementing a reliable lease-based fencing mechanism for shared storage devices 135A-N. In one embodiment, one of the storage controllers 105 and 110 may be designated as the primary controller and the other may be designated as the secondary controller. The primary storage controller may be configured to extend lease windows after establishing ownership of the shared storage devices 135A-N and may also be configured to enforce access failures on expired leases. In one embodiment, a valid lease may permit a storage controller to perform a write operation to a shared storage device on behalf of a client without having to check for permission from another storage controller that has access to the storage device. For example, in various embodiments the lease defines a time period during which the primary storage controller can perform write operations without further reference to any other storage controllers.

In one embodiment, enforcement of the lease may occur in the storage controller operating system kernel, at the lowest layer of the storage driver stack. However, it is contemplated that such enforcement may occur elsewhere within a given system. In one embodiment, the storage driver stack may be a SCSI stack. In one embodiment, enforcement may include performing command descriptor block (CDB) parsing to split SCSI commands into non-state-changing (or harmless) commands (e.g., reads, TEST_UNIT_READY, READ_CAPACITY, PERSISTENT_RESERVE_IN, MAINTENCE_IN) and state-changing (or dangerous) commands (e.g., writes, FORMAT_UNIT, ERASE, WRITE_SAME, UNMAP). The non-state-changing commands may be harmless no matter which or how many controllers perform them while the state-changing commands may become harmful when performed concurrently by multiple controllers. In some cases, there may be commands that are considered non-state-changing for a first system design which may be considered state-changing for a second system design. These commands may include SYNCHRONIZE_CACHE, SECURITY_PROTOCOL_OUT (SECURITY_UNLOCK), ENABLE_ADVANCED_POWER_MANAGEMENT, and SECURITY_DISABLE_PASSWORD. In some embodiments, non-state-changing commands may always be allowed while state-changing commands may only be permitted within the lease window.

Queueing times may cause a delay between issuing a command from userspace and the command reaching the storage device. Accordingly, queuing inside the kernel may be minimized in order to minimize these delays. However, since there is still queuing possible inside the storage devices, the lease window may be sized so that it is comfortably smaller than the takeover window, wherein the takeover window is defined as the amount of time without detecting a heartbeat that the secondary controller waits before taking over as the new primary controller.

It is noted that in alternative embodiments, the number and type of client computers, storage controllers, networks, storage device groups, and data storage devices is not limited to those shown in FIG. 1. At various times one or more clients may operate offline. In addition, during operation, individual client computer connection types may change as users connect, disconnect, and reconnect to system 100. Further, the systems and methods described herein may be applied to directly attached storage systems or network attached storage systems and may include a host operating system configured to perform one or more aspects of the described methods. Numerous such alternatives are possible and are contemplated.

Network 120 may utilize a variety of techniques including wireless connection, direct LAN connections, wide area network (WAN) connections such as the Internet, a router, storage area network, Ethernet, and others. Network 120 may comprise one or more LANs that may also be wireless. Network 120 may further include remote direct memory access (RDMA) hardware and/or software, transmission control protocol/internet protocol (TCP/IP) hardware and/or software, router, repeaters, switches, grids, and/or others. Protocols such as Fibre Channel, Fibre Channel over Ethernet (FCoE), iSCSI, and so forth may be used in network 120. The network 120 may interface with a set of communications protocols used for the Internet such as the Transmission Control Protocol (TCP) and the Internet Protocol (IP), or TCP/IP.

Client computer systems 115 and 125 are representative of any number of stationary or mobile computers such as desktop personal computers (PCs), servers, server farms, workstations, laptops, handheld computers, servers, personal digital assistants (PDAs), smart phones, and so forth. Generally speaking, client computer systems 115 and 125 include one or more processors comprising one or more processor cores. Each processor core includes circuitry for executing instructions according to a predefined general-purpose instruction set. For example, the x86 instruction set architecture may be selected. Alternatively, the ARM®, Alpha®, PowerPC®, SPARC®, or any other general-purpose instruction set architecture may be selected. The processor cores may access cache memory subsystems for data and computer program instructions. The cache subsystems may be coupled to a memory hierarchy comprising random access memory (RAM) and a storage device.

Figure 2:
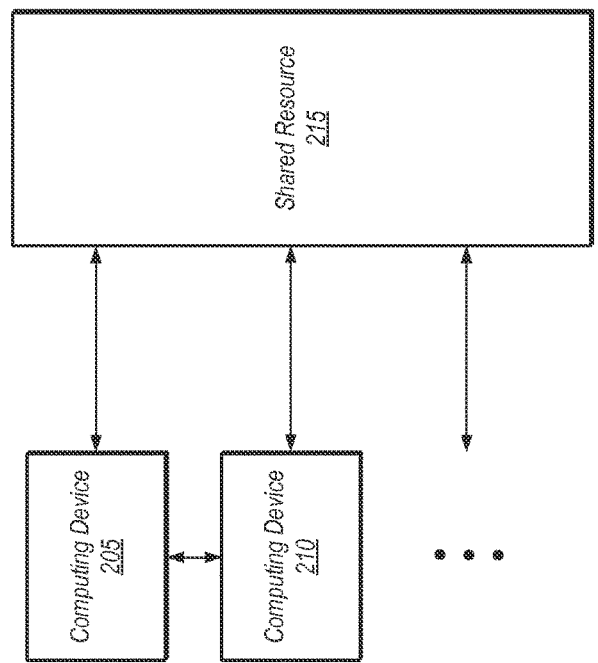
FIG. 2 is a generalized block diagram of one embodiment of two computing devices coupled to a shared resource.

Turning now to FIG. 2, a block diagram of one embodiment two computing devices 205 and 210 coupled to a shared resource 215 is shown. It is noted that the two computing devices 205 and 210 are representative of any number and type of computing devices which may be coupled to shared resource 215. In addition, in some embodiments, computing devices 205 and 210 may be coupled to a plurality of shared resources, although this is not shown in FIG. 2. Each of computing devices 205 and 210 may be any type of computing device or system, such as a server, computer, smartphone, tablet, storage controller, virtual machine, or other entity which is capable of resource ownership. For example, in one embodiment, computing devices 205 and 210 may be storage controllers and resource 215 may be one or more storage devices, a storage shelf, or a portion of a storage device. Resource 215 may be any type of entity which permits shared access, such as a file, a record, a memory device, set of memory devices, a portion of a memory device, or other type of entity, depending on the embodiment.

In one embodiment, computing device 205 may operate as a primary device with read and write access to resource 215 while computing device 210 may operate as a secondary device with only read access to resource 215. In various embodiments, the device designated as the primary device (computing device 205 in this example,) may be configured to generate a heartbeat periodically (e.g., every N seconds, wherein N may be a fraction of a second). Depending on the embodiment, a heartbeat may be a signal or pulse generated by the computing device 205 and conveyed to computing device 210 and/or shared resource 215, a region of memory in resource 215 that is updated by computing device 205, or another suitable mechanism for indicating the health or status of computing device 205. In one embodiment, computing device 205 may generate a heartbeat every 100 milliseconds (ms) (or 0.1 seconds). In one embodiment, computing device 205 may issue itself a new lease window of M seconds every time it has generated a successful heartbeat, wherein M may be a fraction of a second, and wherein the lease window is extended from the time of a prior heartbeat rather than the current heartbeat. Alternatively, in another embodiment, the lease extension may be calculated from the time of a prior lease extension. In a further embodiment, the lease extension may be calculated from any point in time prior to the current heartbeat. For example, in this further embodiment, computing device 205 may take a timestamp and then perform the necessary verifications for confirming ownership of resource 215. After performing the necessary verifications, computing device 205 may extend the lease.

In one embodiment, computing device 210 may detect when heartbeats are generated by computing device 205, and if computing device 210 does not detect a heartbeat for a certain period of time (i.e., the takeover window), then computing device 210 may take over as the primary computing device 210. The takeover window may be programmable and may vary depending on the embodiment. After taking over as the primary device, if computing device 205 were to perform an unauthorized access to resource 215, such an unauthorized access could result in data corruption or other unintended outcomes.

Therefore, to prevent both computing devices from attempting to simultaneously control resource 215, a new lease extension may be calculated from the time of a prior lease extension. Depending on the embodiment, the lease extension may be calculated from the time of the heartbeat immediately prior to the current heartbeat, two heartbeats ago, three heartbeats ago, four heartbeats ago, or some other point in time in the past. By utilizing this scheme, at least a portion of the new lease window is for time that has already expired.

In the case where computing device 205 experiences a stall longer than the lease window between generating the heartbeat and extending the lease, the lease will already be expired when the lease gets extended for computing device 205 if the lease is extended from the previous heartbeat. For example, in one embodiment, if the lease window is 500 ms, and if computing device 205 experiences a stall for 1 second between heartbeats at times of 0 seconds and 1 second, then the new lease window granted for the heartbeat generated at time 1 second will be calculated from the previous heartbeat, which is 0 seconds. Accordingly, the lease will expire at 500 ms, which is in the past, and computing device 205 will have an expired lease at time 1 second preventing it from making an access to resource 215. This scheme allows computing device 205 to make one wrong decision after a stall and not cause a catastrophic failure. Therefore, when computing device 210 takes over as the new primary computing device at time 1 second, computing device 205 will be unable to access resource 215 and perform any actions which might corrupt or otherwise cause unintended behavior.

Figure 3:
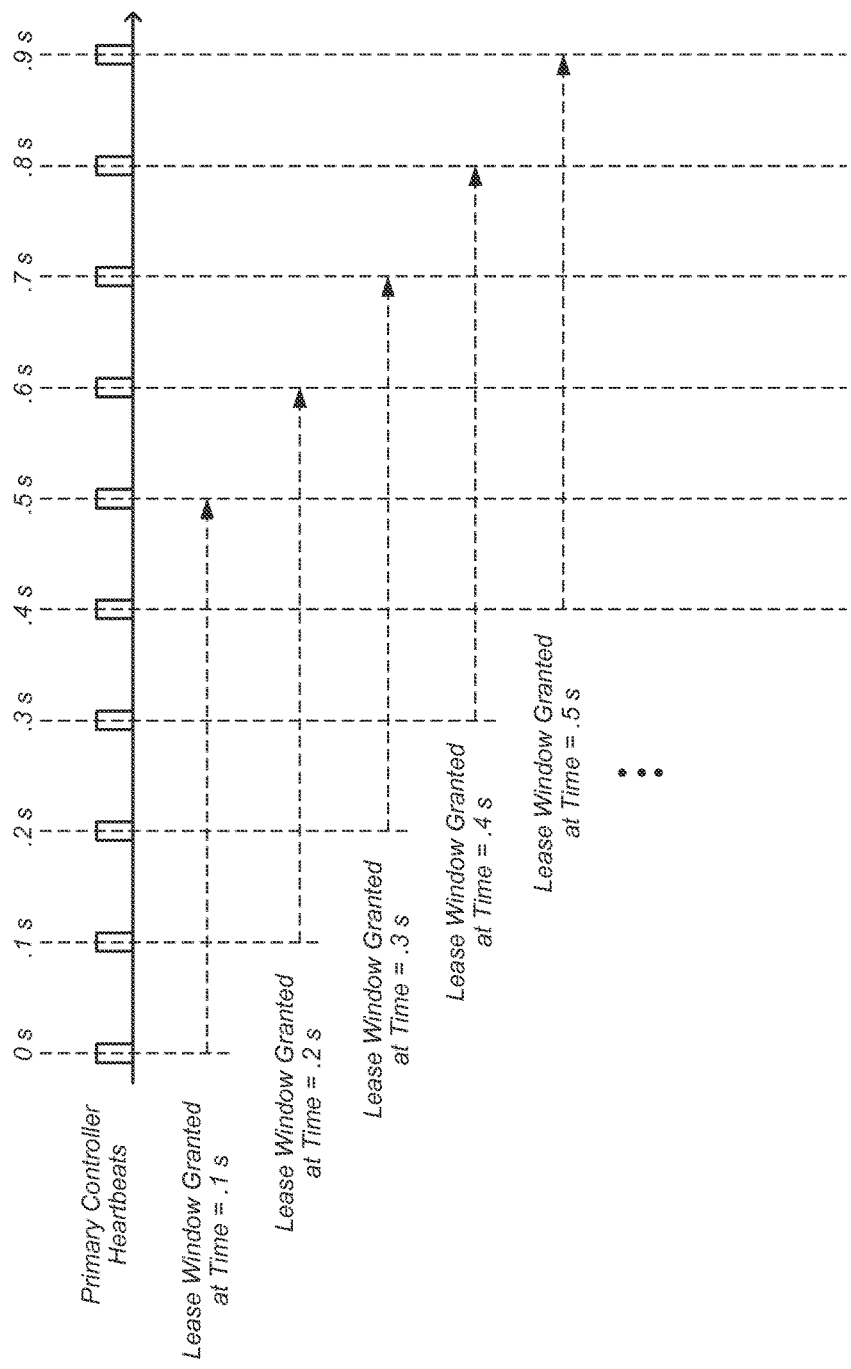
FIG. 3 illustrates one embodiment of a timing diagram of a primary controller generating heartbeats and the corresponding lease extensions.

Referring now to FIG. 3, a timing diagram of one embodiment of a primary controller generating heartbeats and the corresponding lease extensions are shown. A healthy primary controller may generate heartbeats at fixed intervals in time, and the length of the fixed interval may be programmable and may vary according to the embodiment. As shown in FIG. 3, the interval for generating heartbeats is 100 ms, but this is used for illustrative purposes only. The primary storage controller may include a heartbeat interval counter for generating heartbeats, and the counter may be implemented using hardware or software.

The top row of FIG. 3 shows the generation of heartbeats every 100 ms (or 0.1 seconds) for the primary controller. The second row of FIG. 3 shows the extension of the lease window based on the heartbeat generated at time 0.1 seconds. The lease extension is determined by calculating the start of a new lease window from a point in time in the past. In this case, the point in time in the past is selected as the previous heartbeat at time 0 seconds. In other scenarios, the point in time in the past may vary. In this example, the lease window is 500 ms, but it is to be understood that the length of the lease window may be programmable and may have other values in other embodiments. Accordingly, the new lease window will expire at time 0.5 seconds for the heartbeat generated at time 0.1 seconds, which is an effective lease window of 0.4 seconds from the current time.

The third row of FIG. 3 shows the lease extension granted for the heartbeat generated at time 0.2 seconds. For this heartbeat, the lease window is calculated from the previous heartbeat which was generated at time 0.1 seconds. Therefore, the lease window of 500 ms is extended from 0.1 seconds to 0.6 seconds. Similarly, the fourth row shows the lease extension granted for the heartbeat generated at time 0.3 seconds. For this heartbeat, the lease extension is calculated from the time of the previously granted lease extension (at time 0.2 seconds). Therefore, the primary controller's lease now extends to 0.7 seconds. This pattern of extending the lease may continue for each heartbeat generated by the healthy primary controller. Lease extensions are also shown in FIG. 3 for the heartbeats generated at times 0.4 seconds and 0.5 seconds.

Turning now to FIG. 4, one embodiment of a table 400 storing entries corresponding to successfully generated heartbeats is shown. Table 400 includes entries 405A-E for the successfully generated heartbeats shown in the timing diagram of FIG. 3. Table 400 is intended to represent the timing of lease windows that are issued for each successful heartbeat and to show how the lease windows are dependent on previously generated heartbeats. In one embodiment, table 400 may be maintained by the primary storage controller and stored in the one or more shared storage devices. One or more secondary storage controller may also have access to table 400 in some embodiments. Although not shown in table 400, each entry in table 400 may also include an identifier of the storage controller which generated the heartbeat.

Entry 405A corresponds to the successful heartbeat generated at 0.1 seconds by the primary storage controller as shown in FIG. 3. The time of the previous heartbeat is 0 seconds, and so the lease window of 0.5 seconds is calculated from the previous heartbeat and therefore extends to 0.5 seconds. Accordingly, the lease window granted at time 0.1 seconds begins at a previous point in time (0 seconds) and expires at 0.5 seconds, giving an effective period of lease of 0.4 seconds.

This pattern continues for entry 405B which corresponds to the successful heartbeat performed at 0.2 seconds. As shown in entry 405B, the new lease window is valid from 0.1 seconds to 0.6 seconds. Similarly, entry 405C corresponds to the successful heartbeat performed at 0.3 seconds, and the lease window for this heartbeat will be calculated from the previous heartbeat of entry 405B (at 0.2 seconds)

until 0.7 seconds when the new lease will expire. This pattern continues for entries 405D-E which will have their leases extended until 0.8 seconds and 0.9 seconds, respectively.

It is noted that in other embodiments, the lease window could be calculated from the time corresponding to two or more heartbeats prior to the current heartbeat. In other words, instead of calculating the lease extension from the time of the previous entry of table 400, the lease extension could be calculated from the time of the entry which is two or more entries prior to the current entry of table 400. For example, for entry 405D corresponding to the successful heartbeat at 0.4 seconds, the lease window could be calculated from entry 405A performed at 0.1 seconds. Accordingly, for this example, the lease window would go from 0.1 seconds to 0.6 seconds, giving an effective lease life of 0.2 seconds from the current time of 0.4 seconds. In other embodiments, the lease window may be calculated from other points in time from the past which are correlated to previous heartbeats, previous lease extensions, or other events or timestamps from the past.

Figure 5:
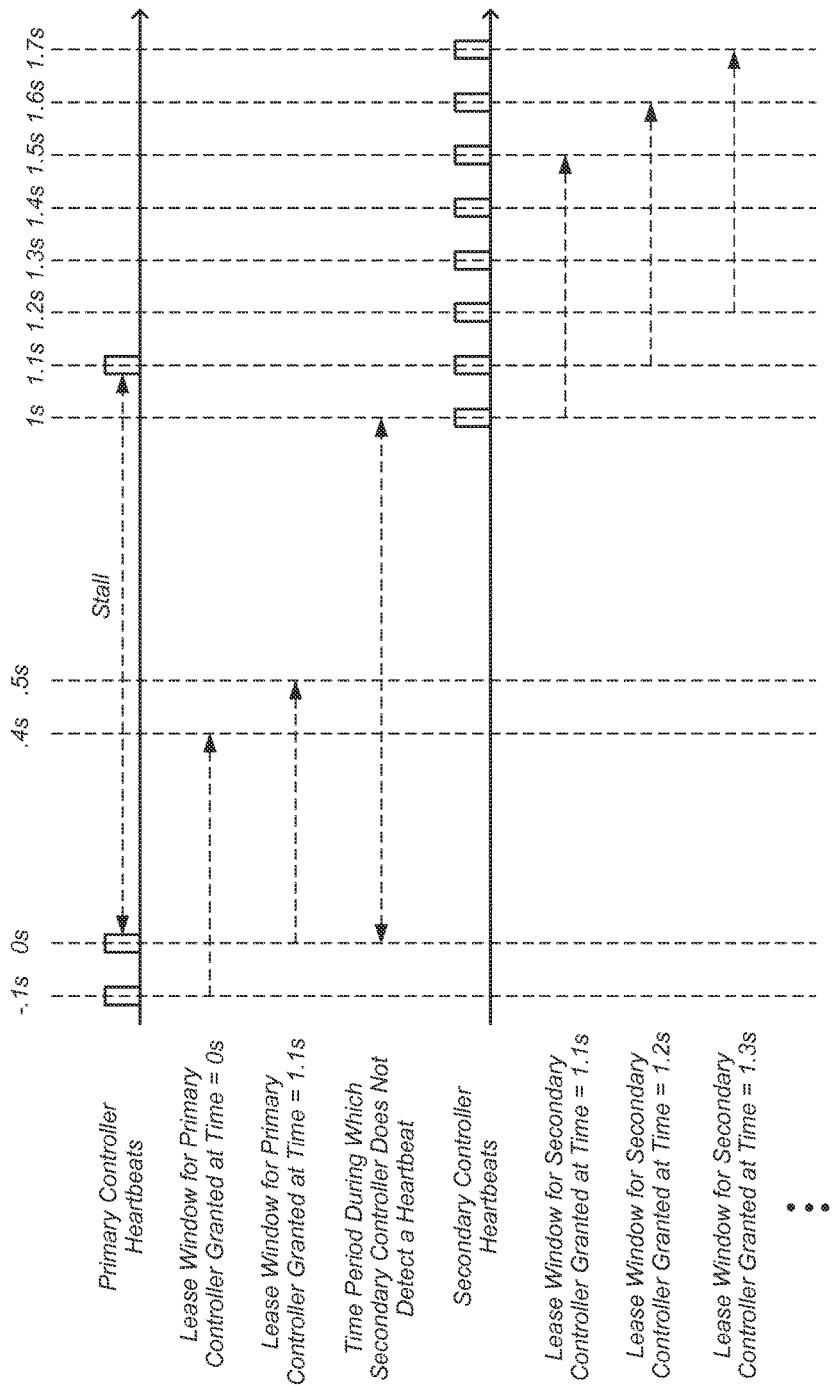
FIG. 5 illustrates one embodiment of a timing diagram of a stalled primary controller.

Turning now to FIG. 5, a timing diagram of one embodiment of a stalled primary controller is shown. It may be assumed for the purposes of this discussion that the primary controller was functioning properly up until time 0 seconds. It may also be assumed that when healthy, the primary controller is configured to generate heartbeats every 0.1 seconds. It may also be assumed that the lease window is 0.5 seconds and that the takeover window is 1 second. In other embodiments, these values may vary within the constraints that the takeover window is greater than the lease window which is greater than the heartbeat interval. The primary controller generates heartbeats at −0.1 seconds and 0 seconds, and for the heartbeat generated at 0 seconds, the lease window is calculated from the heartbeat generated at −0.1 seconds. Accordingly, this lease window expires at 0.5 seconds.

After the heartbeat at 0 seconds, it may be assumed that the primary controller stops functioning normally and stalls rather than generating new heartbeats. As shown, the primary controller does not generate a heartbeat from time 0 seconds until time 1.1 seconds. The secondary controller may detect heartbeats generated by the primary controller, and when the secondary controller detects no new heartbeats for a length of time equal to or greater than the takeover window, the secondary controller may take over as the new primary controller. It is noted that in some embodiments, the lease window may be the same size or larger than the takeover window. In these embodiments, the secondary controller can perform part of a takeover, claiming all devices, before the lease expires. However, the secondary controller cannot trust data written to the devices before the lease expires. Therefore, the secondary controller may wait until the lease expires to perform any state-changing operations.

Accordingly, at time 1 second, a full takeover window has elapsed without a heartbeat, and so the secondary controller may generate a new heartbeat. Since this is the first heartbeat generated by the secondary controller, the secondary controller may not be given a lease for this heartbeat. On the next heartbeat generated by the secondary controller (the new primary controller) at 1.1 seconds, a new lease window may be granted and calculated from the previous heartbeat at time 1 second. Therefore, this lease window will extend from 1 second to 1.5 seconds. The secondary controller (or new primary controller) may continue to generate new heartbeats every 0.1 seconds and new lease windows may be granted for each new heartbeat, with the lease window being calculated from a previous heartbeat.

In some cases, the original primary controller may come back up after the stall and attempt to assert itself as the current primary controller. This is shown with the original primary controller generating a heartbeat at 1.1 seconds. For this heartbeat, a lease window may be granted, but this lease window will begin at the previous heartbeat generated by the original primary controller at 0 seconds. Accordingly, this lease window will already be expired at the time it is granted. Therefore, the original primary controller will be prevented from performing an access to the shared storage device(s) and a split-brain scenario will be avoided. In response to detecting the new lease window being expired at the time it is issued, the original primary controller may perform a check to determine if another storage controller has taken over as the new primary controller. In one embodiment, the original primary controller may detect heartbeats generated by the new primary controller and in response, the original primary controller may transition to the role of secondary controller.

Turning now to FIG. 6, one embodiment of tables 600 and 610 storing entries corresponding to successfully generated heartbeats are shown. Table 600 corresponds to the original primary storage controller of the timing diagram of FIG. 5. The primary storage controller generated successful heartbeats at times −0.1 second and 0 seconds and then experienced a stall of over a second before generating another heartbeat at time 1.1 seconds. Entry 605A corresponds to the heartbeat at 0 seconds and entry 605B corresponds to the heartbeat at 1.1 seconds. As can be seen from entry 605B, the lease window is calculated from the heartbeat of entry 605A (at 0 seconds) and expires at 0.5 seconds. Therefore, this lease window is already expired at the time it is granted, preventing the original primary storage controller from performing any write operations to the shared stored device(s) at time 1.1 seconds or later.

As shown in the timing diagram of FIG. 5, the secondary controller may detect the absence of heartbeats for a length of time equal to or greater than the takeover window (or 1 second). Accordingly, when no heartbeats are generated by the original primary controller from 0 seconds to 1 second, the secondary controller may take over as the new primary controller. Table 610 shows entries corresponding to the heartbeats generated by the original secondary controller acting as the new primary controller. The new primary controller may generate a heartbeat at 1 second (corresponding to entry 615A), and a lease may not be granted at this point since this is the first heartbeat generated by the new primary controller. At the next heartbeat at 1.1 seconds for the new primary controller, a new lease may be granted and the new lease window may be calculated from the previous heartbeat (at 1 second) of entry 615A. Entry 615B shows the details of the new lease which extends from 1 second to 1.5 seconds.

Entry 615C corresponds to the heartbeat performed at time 1.2 seconds, and the lease window may be calculated from the time of the previous entry 615B (or 1.1 seconds). Accordingly, the new lease for entry 615C expires at 1.6 seconds. Similarly, entry 615D corresponds to the heartbeat performed at time 1.3 seconds, and the lease window may be calculated from the time of the previous entry 615C (or 1.2 seconds). Therefore, the new lease for entry 615D expires at 1.7 seconds. This pattern may continue for each newly generated heartbeat by the new primary controller. It is noted that tables 600 and 610 may be combined into a single table in some embodiments. To differentiate between heartbeats generated by different controllers, each entry may include an identifier (ID) of the controller which generated the heartbeat.

Figure 7:
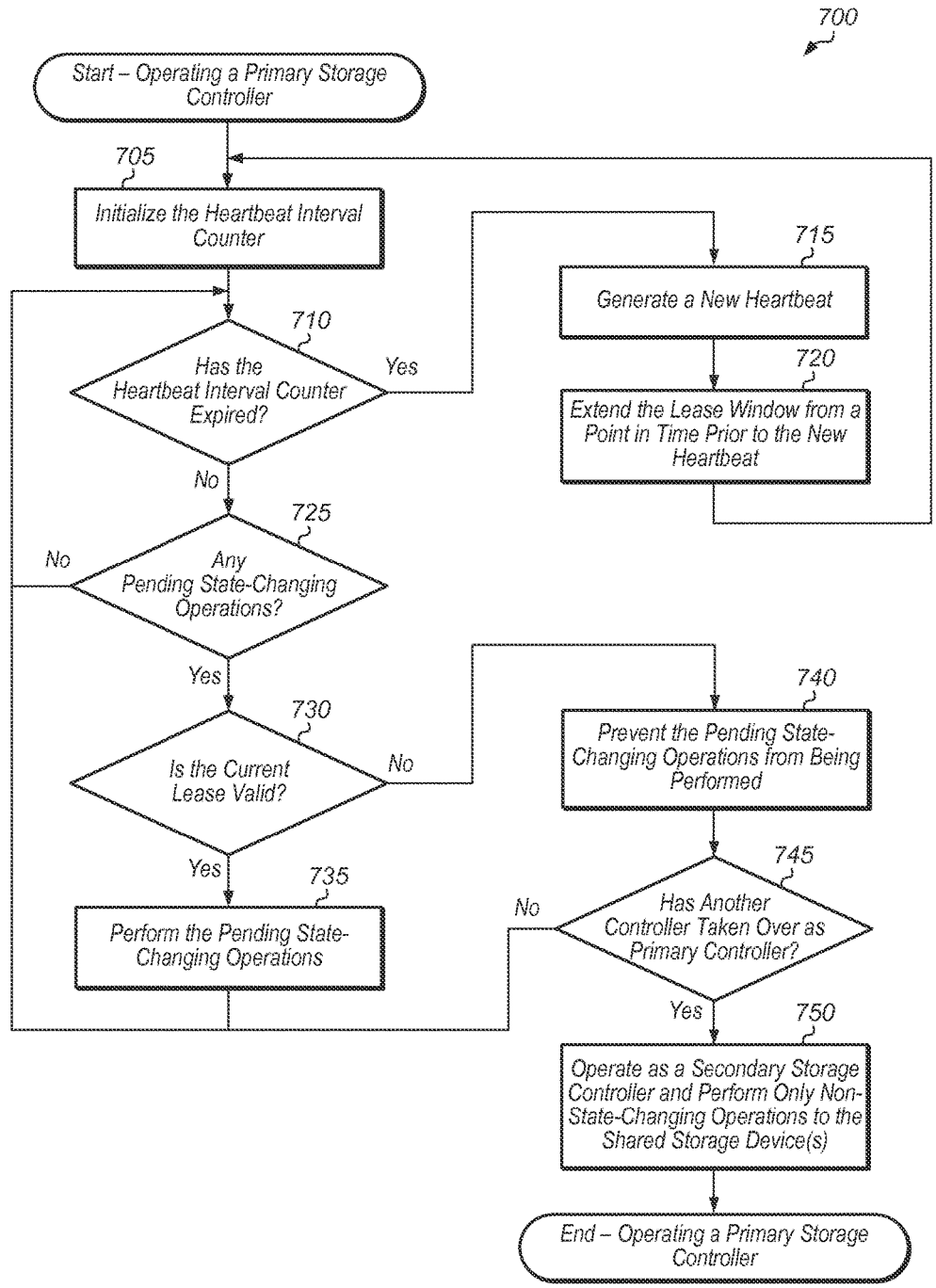
FIG. 7 is a generalized flow diagram illustrating one embodiment of a method for performing operations of a primary storage controller.

Turning now to FIG. 7, one embodiment of a method 700 for performing operations of a primary storage controller is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Method 700 may be performed in any of the storage controllers described herein.

A heartbeat interval counter used for determining when to generate a heartbeat for a storage controller may be initialized (block 705). In one embodiment, the counter may be configured to count until 100 ms has elapsed. In other embodiments, the counter may be configured to count for other periods of time. Next, the storage controller may determine if the heartbeat interval counter has expired (conditional block 710).

If the heartbeat interval counter has expired (conditional block 710, "yes" leg), then the storage controller may generate a new heartbeat (block 715). After generating the heartbeat, the storage controller may extend the lease window from a previous point in time prior to the new heartbeat, wherein the lease window allows state-changing operations to be performed to the one or more shared storage device(s) (block 720). In one embodiment, the extension of the lease window may be calculated from a previously generated heartbeat rather than the most recently generated heartbeat. In other words, the lease window may be extended from the point in time when a previous lease extension was made. For example, if the current heartbeat is generated at 1 second, the storage controller may determine when the heartbeat prior to the current heartbeat was generated, and then extend the lease window from that point in time. Accordingly, if the previous heartbeat was performed at 0.9 seconds, then the lease window may be extended from 0.9 seconds. The length of the lease window (e.g., 500 ms) may vary according to the embodiment.

If the heartbeat interval counter has not expired (conditional block 710, "no" leg), then the storage controller may determine if there are any pending state-changing operations targeting the shared storage device(s) (conditional block 725). If there are any pending state-changing operations targeting the shared storage device(s) (conditional block 725, "yes" leg), then the storage controller may determine if it has a valid lease for writing to the shared storage device(s) (conditional block 730). If there are no pending state-changing operations targeting the shared storage device(s) (conditional block 725, "no" leg), then method 700 may return to conditional block 710 to determine if the heartbeat interval counter has expired.

If the storage controller currently has a valid lease for writing to the shared storage device(s) (conditional block 730, "yes" leg), then the storage controller may perform the pending state-changing operations to the shared storage device(s) (block 735). After block 735, method 700 may return to conditional block 710 to determine if the heartbeat interval counter has expired. If the storage controller does not have a valid lease for writing to the shared storage device(s) (conditional block 730, "no" leg), then the storage controller may prevent the pending state-changing operations from being written to the shared storage device(s) (block 740). It is noted that a different storage controller which has a valid lease may perform the pending state-changing operations to the shared storage device(s).

After block 740, the storage controller may perform a check to determine if another storage controller has taken over as the new primary storage controller (conditional block 745). In various embodiments, the storage controller may determine if another storage controller has taken over as the new primary storage controller by detecting heartbeats generated by another controller, checking the heartbeat status table(s) (e.g., tables 400, 600, 610) for heartbeats generated by other controllers, querying the other controllers, and/or utilizing various other techniques. If another storage controller has taken over as the new primary storage controller (conditional block 745, "yes" leg), then the storage controller may operate as a secondary storage controller by performing only read operations to the shared storage device(s) (block 750). After block 750, method 700 may end. If no other storage controller has taken over as the new primary storage controller (conditional block 745, "no" leg), then method 700 may return to conditional block 710 to determine if the heartbeat interval counter has expired.

It is noted that method 700 may be implemented with multiple processes in some embodiments. For example, in another embodiment, the storage controller may constantly monitor the heartbeat interval counter with one process and use one or more other processes to determine whether there are state-changing operations pending, determine if there is a valid lease for performing state-changing operations, perform state-changing operations, and/or detect one or more other conditions.

Figure 8:
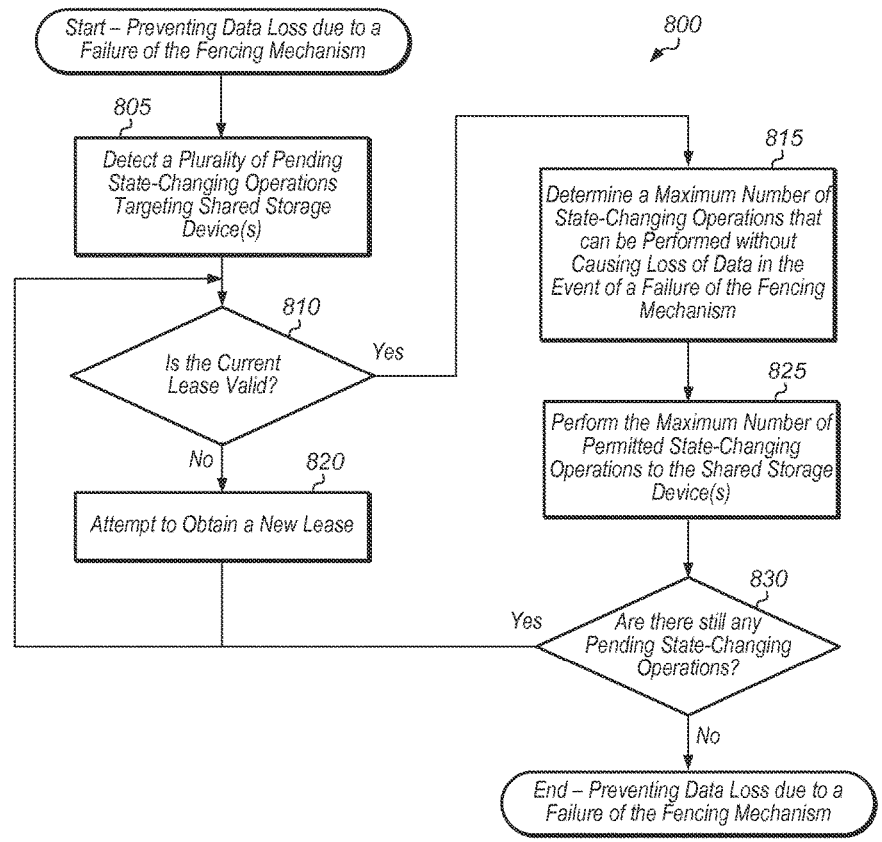
FIG. 8 is a generalized flow diagram illustrating one embodiment of a method for allowing for state-changing operations to occur at any time without suffering a data loss due to a failure of the fencing and lease mechanisms.

Turning now to FIG. 8, one embodiment of a method 800 for allowing for state-changing operations to occur at any time without suffering a data loss due to a failure of a lease or other mechanism is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Method 800 may be performed in any of the storage controllers described herein.

A storage controller may detect a plurality of pending state-changing operations targeting one or more shared storage devices (block 805). In response to detecting the plurality of pending state-changing operations, the storage controller may determine if there is a valid lease for performing the pending state-changing operations to the shared storage device(s) (conditional block 810). If the lease is valid (conditional block 810, "yes" leg), then the storage controller may determine a maximum number of state-changing operations that can be performed (and allowed to be in progress) without risking loss or inadvertent corruption of data or storage devices in the event of a failure of the fencing mechanism in the presence of state-changing operations (block 815). Alternatively, the number of state-changing operations that can safely be performed without causing loss or corruption of data or storage devices in the event of a failure may have previously been determined. In other words, the storage controller may determine how many and which of the pending state-changing operations could be recovered from if the lease or fencing mechanism fails and these pending state-changing operations were performed after the lease expires. In one scenario, the lease mechanism may fail if there is an unexpectedly long delay between checking the validity of the lease and performing the state-changing operation(s). In some cases a valid lease may no longer exist when the state-changing operations are performed. If the lease is then determined to not be valid (conditional block 810, "no" leg), then the storage controller may attempt to obtain a new lease (block 820). After block 820, method 800 may return to block 810 to determine if there is a valid lease for performing the pending state-changing operations.

The maximum number of the pending state-changing operations that can be performed without causing irrevocable damage if the lease mechanism were to fail may be based on the protection scheme which is being utilized for the shared storage devices. For example, if the protection scheme can withstand a single device failing or having corrupt data, any number of state-changing operations can be performed to one device. For a protection scheme that protects only one device, if there are pending state-changing operations targeting multiple storage devices, then state-changing operations may only be performed on a single device before checking the validity of the lease. Alternatively, if the protection scheme (e.g., RAID 6) being utilized provides fault tolerance for up to two failed devices, then state-changing operations may only be performed on two devices before checking the validity of the lease. For other types of protection schemes, the maximum number of state-changing operations which can be performed after checking the validity of the lease may vary based on the number of errors or failed storage devices the particular protection scheme can withstand if the lease mechanism were to fail. The number of allowed state-changing operations may also be limited to allow for one or more devices to fail or be corrupted due to some issue unrelated, such as failures within the devices themselves. For example, with RAID-6, we may allow one outstanding state-changing operation so that one unrelated device failure can be tolerated as well as one corruption resulting from a state-changing operation that happened after lease expiry.

In another embodiment, rather than determining a maximum number of pending state-changing operations which can be performed based on the current protection scheme, the storage controller may allow for a fixed number (which may be programmable) of state-changing operations to be performed after checking the validity of the lease. For example, in one embodiment, only a single state-changing operation may be allowed to be performed to a single storage device in response to determining the lease is valid. After performing the single state-changing operation, the validity of the lease may be checked again, and the next state-changing operation may be performed if the lease is still valid, with this process being repeated for each remaining pending state-changing operation.

After block 815, the storage controller may perform the maximum number of permitted state-changing operations to the shared storage device(s) (block 825). Next, the storage controller may determine if there are still any pending state-changing operations (conditional block 830). If there are one or more pending state-changing operations (conditional block 830, "yes" leg), then method 800 may return to block 810 to determine if there is a valid lease for performing the pending state-changing operations. If there are no more pending state-changing operations (conditional block 830, "no" leg), then method 800 may end.

It is noted that the above-described embodiments may comprise software. In such an embodiment, the program instructions that implement the methods and/or mechanisms may be conveyed or stored on a non-transitory computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A storage system comprising:
    a plurality of storage controllers configured to couple to one or more client computer systems via one or more data communications links; and
    one or more storage devices coupled to the plurality of storage controllers;
    wherein a first storage controller of the plurality of storage controllers is configured to:
    generate heartbeats on intervals of a first period of time; responsive to generating a current heartbeat, issue a lease based on an extension calculated from a prior heartbeat; determine that a lease is invalid based on the lease extension calculated from the prior heartbeat being smaller than a takeover window calculated from the prior heartbeat; responsive to determining that the lease is invalid, operate as a secondary storage controller instead of a primary storage controller, wherein the first storage controller, operating as the secondary storage controller, is not allowed to perform a state-changing operation on the one or more storage devices;
    determine that the lease is valid based on the lease extension not being smaller than the takeover window; and responsive to determining that the lease is valid, perform a number of pending state-changing operations, wherein the number is less than or equal to a maximum number of state-changing operations that can be performed without causing data loss due to a failure of a fencing mechanism;
    recheck if the lease is valid responsive to performing the number of pending state-changing operations; and
    perform a second number of state-changing operations responsive to determining the lease is valid, wherein the second number is less than or equal to the maximum number.

2. The storage system as recited in claim 1, wherein the first storage controller is further configured to prevent state-changing operations from being performed without a valid lease, and wherein the second storage controller cannot perform any state-changing operations on the one or more storage devices without a valid lease.

3. The storage system as recited in claim 1, wherein the first storage controller is a primary storage controller, and wherein a second storage controller of the plurality of storage controllers is configured to take over as a new primary storage controller responsive to detecting that the first storage controller has not generated a heartbeat for a third period of time.

4. The storage system as recited in claim 3, wherein responsive to taking over as the new primary storage controller, the second storage controller is configured to:
   generate heartbeats on intervals of the first period of time;
   issue a new lease responsive to generating each heartbeat, wherein a beginning of the new lease is calculated from a prior heartbeat and has a duration of a second period of time; and
   determine if a lease is valid prior to performing a state-changing operation on a given storage device.

5. The storage system as recited in claim 1, wherein the lease has a duration of a second period of time.

6. The storage system as recited in claim 1, wherein the non-state-changing operations on the one or more storage devices include operations that read data from the one or more storage.

7. The storage system as recited in claim 1, wherein the first storage controller is further configured to send the heartbeat to the second storage controller via a data communications bus between the first storage controller and the second storage controller.

8. A plurality of storage controllers:
   wherein each of the storage controllers are configured to couple to one or more client computer systems via one or more data communications links and each of the storage controllers are also coupled to one or more storage devices via one or more data communications links,
   wherein a first storage controller is configured to:
      generate heartbeats on intervals of a first period of time;
      responsive to generating a current heartbeat, issue a lease based on an extension calculated from a prior heartbeat; determine that a lease is invalid based on the lease extension calculated from the prior heartbeat being smaller than a takeover window calculated from the prior heartbeat; responsive to determining that the lease is invalid, operate as a secondary storage controller instead of a primary storage controller, wherein the first storage controller, operating as the secondary storage controller, is not allowed to perform a state-changing operation on the one or more storage devices;
      determine that the lease is valid based on the lease extension not being smaller than the takeover window; and responsive to determining that the lease is valid, perform a number of pending state-changing operations, wherein the number is less than or equal to a maximum number of state-changing operations that can be performed without causing data loss due to a failure of a fencing mechanism recheck if the lease is valid responsive to performing the number of pending state-changing operations; and
      perform a second number of state-changing operations responsive to determining the lease is valid, wherein the second number is less than or equal to the maximum number.

9. The plurality of storage controllers as recited in claim 8, wherein the first storage controller is further configured to prevent state-changing operations from being performed without a valid lease, and wherein the second storage controller cannot perform any state-changing operations on the one or more storage devices without a valid lease.

10. The plurality of storage controllers as recited in claim 8, wherein the lease has a duration of a second period of time.

11. The plurality of storage controllers as recited in claim 8, wherein a duration of the lease is calculated from a prior heartbeat generated two intervals prior to the current heartbeat.

12. The plurality of storage controllers as recited in claim 8, wherein at least a portion of said lease is for time that has already expired.

13. The plurality of storage controllers as recited in claim 8, wherein the non-state-changing operations on the one or more storage devices include operations that read data from the one or more storage devices.

14. The plurality of storage controllers as recited in claim 8, wherein the first storage controller is further configured to send the heartbeat to the second storage controller via a data communications bus between the first storage controller and the second storage controller.

15. A method comprising:
   generating, by a first storage controller in storage system that includes a plurality of storage controllers, heartbeats on intervals of a first period of time, wherein the first storage controller and a second storage controller are each configured to couple to one or more client computer systems via one or more data communications links and also coupled to one or more storage devices via one or more data communications links, and wherein the first storage controller operates as a primary storage controller and the second storage controller operates as a secondary storage controller;
   responsive to generating a current heartbeat, issuing, by the first storage controller, a lease based on an extension calculated from a prior heartbeat; and
   determining that a lease is invalid based on the lease extension calculated from the prior heartbeat being smaller than a takeover window calculated from the prior heartbeat;
   responsive to determining that the lease is invalid, operating as the secondary storage controller instead of the primary storage controller, wherein the first storage controller, operating as the secondary storage controller, is not allowed to perform a state-changing operation on the one or more storage devices, and wherein the first storage controller of the plurality of storage controllers and a second storage controller of the plurality of storage controllers are configured to perform non-state-changing operations on the one or more storage devices;
   determining that the lease is valid based on the lease extension not being smaller than the takeover window;
   responsive to determining that the lease is valid, performing a number of pending state-changing operations, wherein the number is less than or equal to a maximum number of state-changing operations that can be performed without causing data loss due to a failure of a fencing mechanism;
   recheck if the lease is valid responsive to performing the number of pending state-changing operations; and
   perform a second number of state-changing operations responsive to determining the lease is valid, wherein the second number is less than or equal to the maximum number.

16. The method as recited in claim 15, further comprising preventing state-changing operations from being performed without a valid lease.

17. The method as recited in claim 15, wherein the lease has a duration of a second period of time.

18. The method as recited in claim 15, wherein the non-state-changing operations on the one or more storage devices include operations that read data from the one or more storage devices.

19. The method as recited in claim 15, wherein at least a portion of said lease is for time that has already expired.

20. The method of claim 15 further comprising sending, from the first storage controller to the second storage controller, the heartbeat via a data communications bus between the first storage controller and the second storage controller.

\* \* \* \* \*